Oct. 6, 1964

R. L. CUMMINGS 3,152,260

SOLAR POWER PLANT

Filed Jan. 30, 1961

INVENTOR.
ROBERT L. CUMMINGS
BY
ATTORNEYS

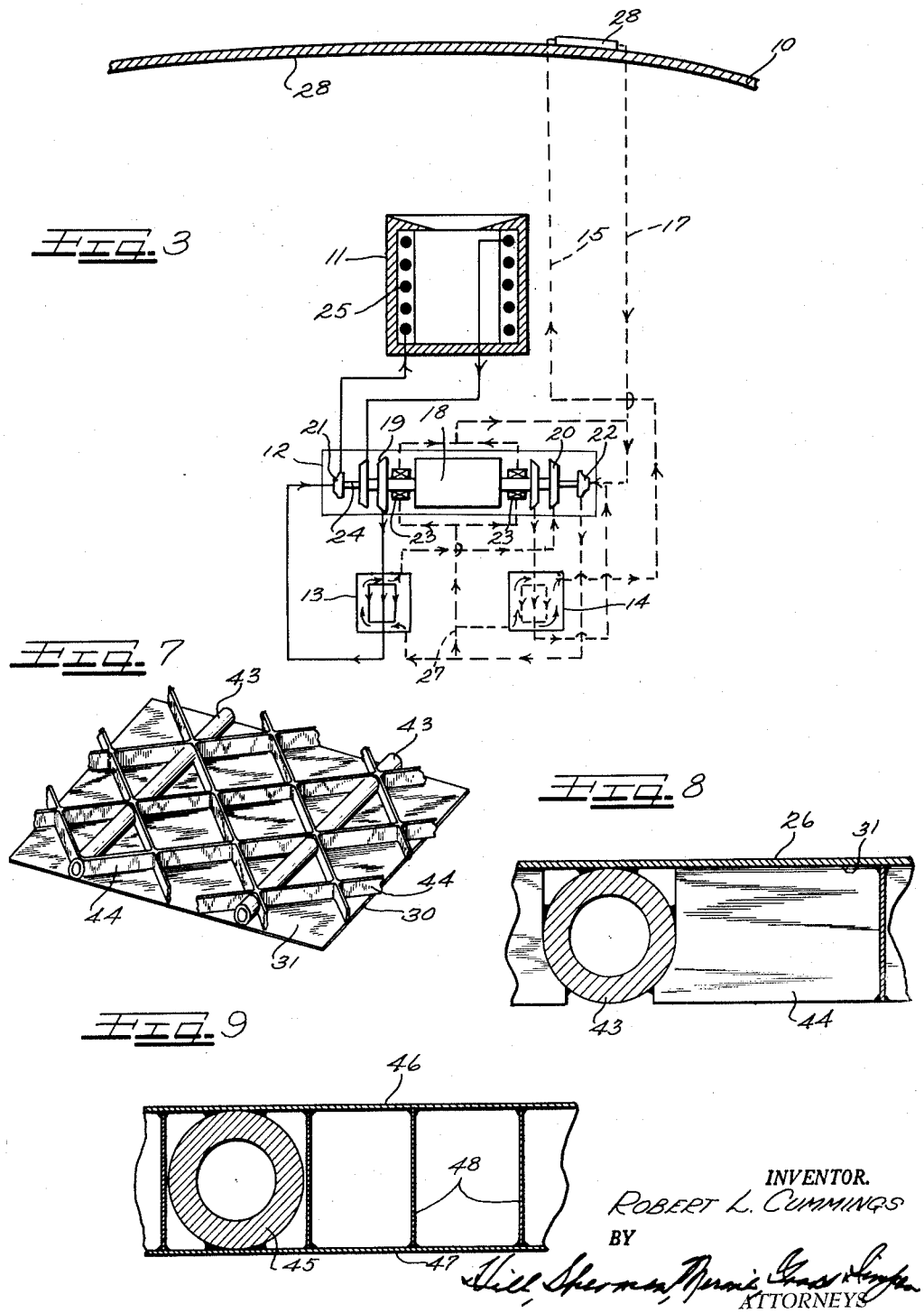

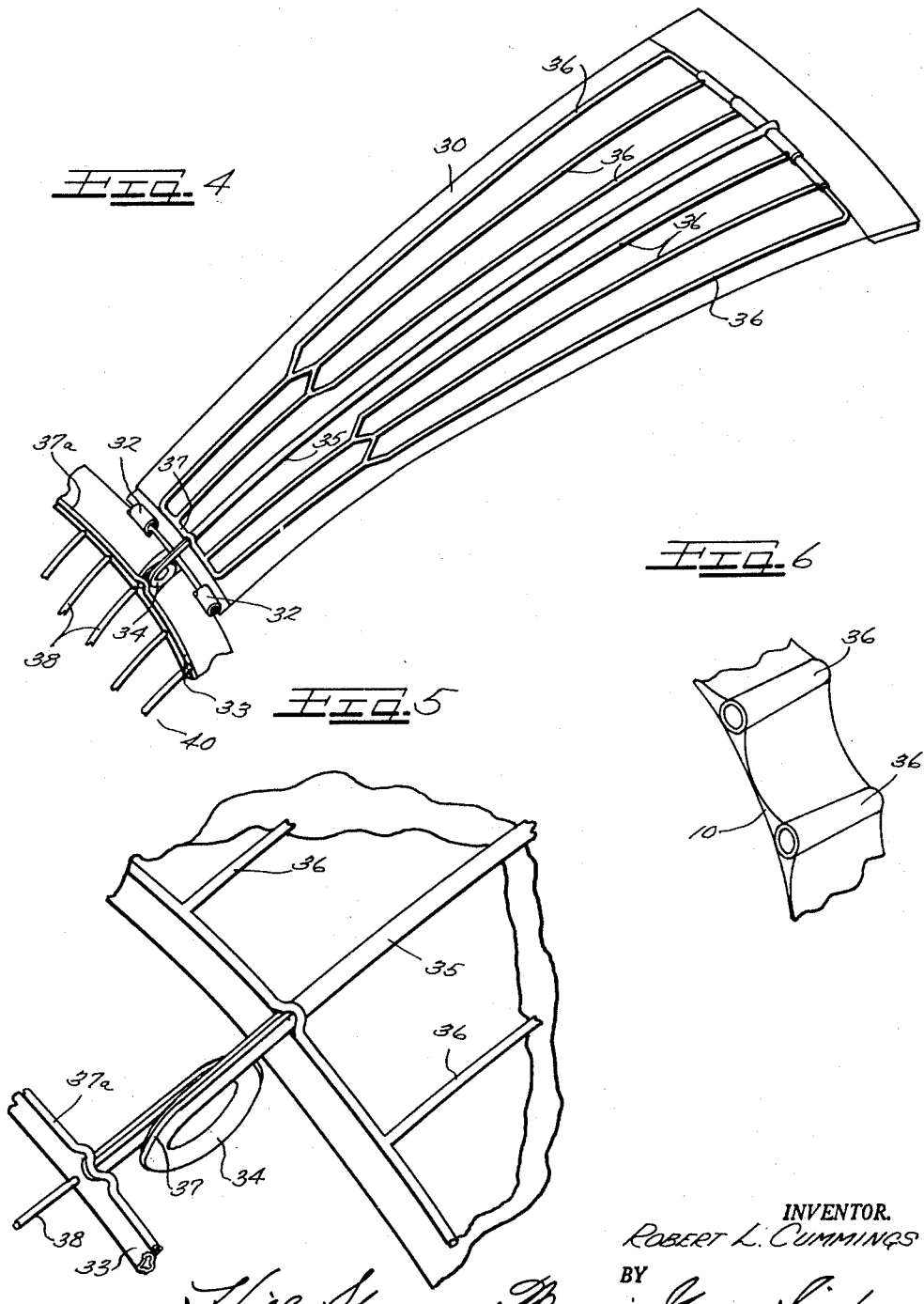

United States Patent Office 3,152,260
Patented Oct. 6, 1964

3,152,260
SOLAR POWER PLANT
Robert L. Cummings, Wickliffe, Ohio, assignor to Thompson Ramo Wooldridge Inc., Cleveland, Ohio, a corporation of Ohio
Filed Jan. 30, 1961, Ser. No. 85,650
7 Claims. (Cl. 290—52)

This invention relates to power conversion systems and, more particularly, to a system which converts solar energy to electrical energy and is especially designed for space vehicles.

In the past, photovoltaic power conversion systems have been used to satisfy the electric power requirements of space vehicles, but they have the disadvantage that their cost and sensitivity to bombardment with high energy protons limit their applicability to very low power systems and certain satellite orbits. Solar Rankine cycle systems using turbo-electric machinery offer many advantages in the medium power range applications but conventional systems that have been proposed are deficient because they tend to be bulky and relatively heavy. Power conversion systems for space vehicles should, of course, be compact and have as low a weight-to-power output ratio as possible.

To reduce these factors the efficiency of a solar Rankine cycle system must be increased which in turn requires that either the upper cycle temperature be increased or the sink temperature be decreased. Also the system must be designed to utilize all of its components to their fullest extent.

Accordingly, it is an object of this invention to provide a solar Rankine cycle power conversion system that is especially designed for use in space vehicles.

It is another object of this invention to provide a power system which converts solar energy into electrical energy and is very compact and light-weight.

It is another object of this invention to provide a solar power conversion system which utilizes a binary Rankine cycle turboelectric system wherein two turbines and an alternator are mounted on a shaft in a single housing.

It is another object of this invention to provide a solar power conversion system for space vehicles which has a combination solar collector and heat rejector.

Other objects, features and advantages of the present invention will be apparent from the following detailed description taken in conjunction with the accompanying figures of the drawings, in which:

FIGURE 3 is a diagrammatic illustration of the binary Rankine cycle apparatus for the system;

FIGURE 4 is a view in perspective of a collector-radiator panel constructed in accordance with the invention;

FIGURE 5 is an enlarged view of a fragment of the panel illustrated in FIGURE 4;

FIGURE 6 is another enlarged view of a fragment of the panel illustrated in FIGURE 4;

FIGURE 7 is a view of a portion of a collector-radiator panel constructed in accordance with another embodiment of the invention;

FIGURE 8 is a sectional view of a portion of the panel illustrated in FIGURE 7; and FIGURE 9 is a sectional view illustrating a collector-radiator panel constructed in accordance with another embodiment of the invention.

As shown on the drawings:

Figure 1:
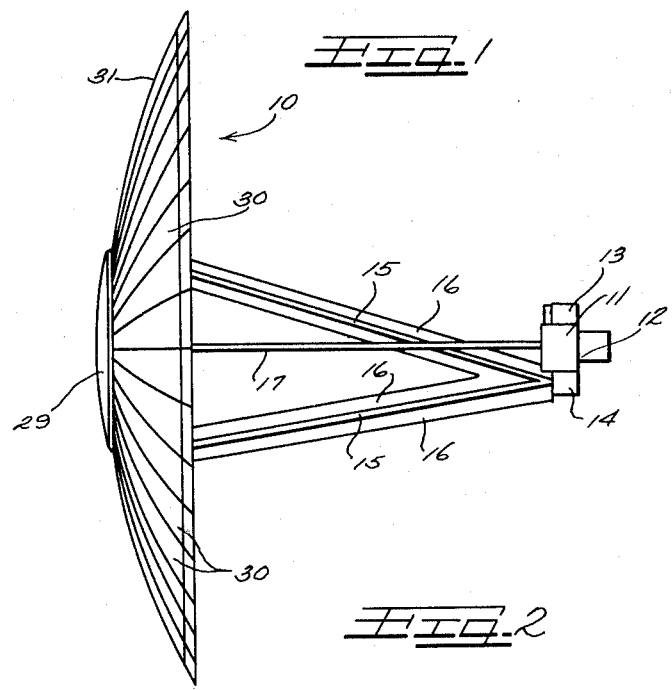
FIGURE 1 is a view in elevation of a solar power conversion system constructed in accordance with the invention.
Figure 2:
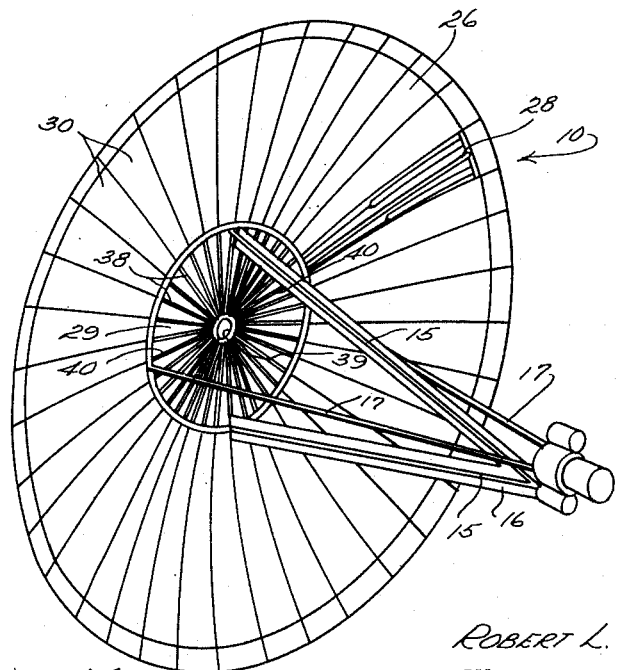
FIGURE 2 is a view in perspective of the power conversion system.

With reference to FIGURES 1 and 2, there is illustrated a solar power plant which includes a combination solar collector-heat radiator 10, which is in the shape of a paraboloid, a cavity type receiver-boiler 11, a binary cycle turbine-alternator package 12, a combination condenser-boiler 13, and a compact condenser 14. It is apparent that the physical arrangement of these components can be varied. A pair of conduits 15 connect the condenser 14 to the conduits running through the heat rejection portion of the collector-radiator 10 and two other conduits 17 return the fluid from the radiator conduits to the condenser-boiler 13. Fins 16 are attached to the conduits 15 and also serve as heat radiators.

The system employs a binary Rankine cycle system wherein two turbines and an alternator are mounted in a hermetically sealed housing on a single shaft. Systems of this type are more completely described in the copending patent application Serial No. 85,718 filed January 30, 1961 in the name of Robert L. Cummings entitled "Turboelectric Power System." The first turbine is designed to use a relatively high temperature working fluid such as mercury and the second turbine is designed to use a relatively low temperature working fluid such as water.

The cycles of these two fluids are diagrammatically illustrated in FIGURE 3 wherein dashed lines are employed to show the flow of the low temperature fluid and solid lines are used to show the flow of the relatively high temperature fluid. The turbine-alternator package 12 includes an alternator 18, a two stage turbine 19 for the high temperature working fluid, a two stage turbine 20 for the low temperature working fluid, two pumps 21 and 22, and two bearings 23 which support the shaft 24 for these components in the sealed package housing.

The relatively high temperature working fluid is passed through a plurality of coils 25 in the receiver-boiler 11, which is disposed at the primary focal point of the reflecting surface 26, FIGURES 2 and 3, of the collector-radiator 10. If desired, a heat storage material may be disposed inside of the cavity type receiver-boiler 11 along with the coils 25 in order to store heat during periods when the power plant is in the shadow of the earth or any other object. The fluid is heated to vapor form in the boiler 11 and then pumped by the pump 21 to the first turbine 19 where a portion of its thermal energy is converted into rotary mechanical energy to drive the shaft 24 and the alternator 18. The exhaust vapor from the turbine 19 is then passed through the combination condenser-boiler 13 where a portion of its heat is extracted so that it is reconverted to a liquid. The pump 21 then returns the liquid to the receiver-boiler 11.

The heat extracted from the relatively high temperature working fluid in the condenser-boiler 13 is employed to heat the relatively low temperature working fluid to vapor form. This second vapor enters the second turbine 20 where a portion of its thermal energy is converted into rotary mechanical energy which aids the first turbine 19 in driving the alternator 18. The exhaust vapor from the turbine 20 is fed into the condenser 14 where it is cooled to liquid form before being returned to the condenser-boiler 13 by the second pump 22.

A portion of the output from the second pump 22 is taken off in front of the condenser-boiler 13 and used as a lubricant for the bearings 22 and 23 and as a coolant for the condenser 14. Fluid from the line 27 is fed to the two bearings and into the condenser 14 where it cools the turbine 20 exhaust. The coolant is connected by the conduits 15, FIGURES 1, 2 and 3, to the heat rejection conduits illustrated diagrammatically at 28 in FIGURES 2 and 3 where it is cooled before being returned by the lines 17 to the pump 22 and the condenser-boiler 13.

With reference again to FIGURES 1 and 2, the combination collector-radiator 10 has a central fixed collector-radiator area 29 and a plurality of radially extending panels 30. The panels 30 and the fixed central area 29 have a reflecting surface 26 formed on their innersides facing the boiler 11 and a primary heat rejecting surface 31 on their opposite sides. The panels 30 are individually hinged to the fixed central area 29 by two hinges 32 that are fixed in slots formed in the periphery of the central fixed area and the inner edge of each of the panels 30. This is necessitated by the fact that during launch and ascent of the power plant in a suitable rocket, the panels 30 are folded inwardly around the conduits 15 and 17 and overlap each other somewhat to form a closed umbrella like structure. After the portion of the rocket containing the solar power plant has been placed in orbit a covering for the power plant is automatically removed and the panels 30 are automatically extended to the positions illustrated in FIGURES 1 and 2 by means to be explained hereinafter. The rocket and other means for placing the power plant in orbit are conventional and, therefore, are not illustrated. Conventional means can also be employed to turn the power plant after it is in orbit so that the reflecting surface 26 will always face the sun. One suitable means for accomplishing this purpose is a photoelectric cell that controls the action of a plurality of thrust nozzles that are capable of turning the power plant in the desired direction. The cell and the nozzles could be mounted on the turbine-alternator package 12.

Fluid passageways for the coolant are formed in the panels 30 and the fixed central section 29 which are illustrated diagrammatically in FIGURES 2 and 3 and in detail in FIGURES 4-9. The two vapor lines 15 are coupled to a vapor header 33 that circles the periphery of the fixed central section 29. Adjacent each of the panels 30 is a flexible loop header 34 which couples the vapor header 33 to a vapor flow line 35 that runs nearly the length of each of the panels 30. The vapor flow line 35 is connected at its outer end to feed a plurality of condense tubes 36 that run along the length of the panels 30, the tubes 36 being connected at their inner ends to a condensate return line 37 which also has a flexible loop. The plurality of lines 37 are coupled to a condensate header 37a which is also connected to the return lines 17.

The vapor header 33 is also coupled to a plurality of radially extending conduits 38 on the fixed central section 29 that are connected at their inner ends by a central condensate header 39, FIGURE 2. The condensate from the central header 39 is returned to the header 37a by two or more other radial condensate lines 40, FIGURES 2 and 4.

The two flexible loop headers that couple the headers 33 and 37a to the panel conduits also act as flexible springs which causes the panel sections 30 to extend to their outstretched positions shown in FIGURES 1 and 2 after the power plant has been placed in orbit. Additional springs could be added if desired to assist in the operation.

As shown in the fragmentary view of FIGURE 6, the condensate carrying conduits 36, and also the vapor conduits 35, in the panels 30 are braised or otherwise bonded to the rear surface of the sheet forming the collector-radiator panels 30.

The collector-radiator panels 30 can also be formed as a waffle structure of the type illustrated in FIGURES 7 and 8. A plurality of fluid carrying tubes 43 and fins 44 are bonded to the rear heat rejecting surface 31 of the panels 30, and an aluminized polished optical surface is formed on the opposite side of the panel. The tubes 43 and the fins or stiffeners 44 are preferably made of aluminum and braised to the heat radiator surface 31. With this construction heat is radiated from both sides of the panel, from the fins, and from the fluid carrying tubes.

In another embodiment of the invention, the collector-radiator panels are formed with a honeycomb sandwich structure of the type illustrated in FIGURE 9. A plurality of fluid carrying conduits 45 are mounted between an optical face 46 and a heat rejection face 47, and the heat is conducted to these elements by a plurality of struts or braces 48 running between these two surfaces. The fluid carrying conduits 45 and the braces are preferably made of aluminum, and can be welded or epoxy bonded to the two surfaces 46 and 47.

In these embodiments of the invention it is preferred that the optic surface be polished and aluminized so that it will have a very low emissivity for long wave infra red radiation. The rear heat rejection surface should be coated with a selectively absorbing coating that has a very high reflectivity in the visible wavelength and a very high emissivity in the far infra red wavelength. This backside coating reduces absorption of sunlight reflected from the earth.

The alternator 18 can be connected to the equipment to be serviced by suitable electrical power lines. After the apparatus has been placed in orbit the power plant can be structurally disengaged from the remainder of the equipment, the only connection being the power line.

It is apparent that a novel and useful power conversion system has been provided. Such a power conversion system is especially adapted for space applications since it is capable of efficiently converting solar energy to electrical energy and it is relatively compact and lightweight. Such a system is very efficient since it employs a binary cycle single shaft construction and it is capable of obtaining very low operating temperatures, and yet does not require a large and heavy heat radiating surface in addition to the solar collector surface. The use of the dual purpose collector-radiator member provides immense savings in weight and space and the binary Rankine cycle turboalternator unit provides an efficient and lightweight power conversion unit. The conduits and fins running across the panels and the central section also act as support members for the thin sheet used as the reflector.

It will be apparent that modifications and variations may be effected without departing from the scope of the novel concepts of the present invention.

I claim as my invention:

1. A solar power conversion system adapted to be used with space vehicles comprising a boiler, means for passing a first working fluid through said boiler, a paraboloidal reflecting surface fastened to said boiler, said boiler being at the prime focal point of said reflecting surface so that the sun's rays are focused on said boiler and the fluid is vaporized, first turbine means connected to the output of said boiler for converting a portion of the thermal energy in said vapor to rotary mechanical energy, an alternator coupled by a shaft to said first turbine, a condenser-boiler, means for circulating said first working fluid from the exhaust of said first turbine through said condenser-boiler and said boiler, a second turbine connected to said shaft, means for circulating a second working fluid through said condenser-boiler and said second turbine, a hermetically sealed housing enclosing said first and second turbines and said alternator, a condenser connected to cool said second working fluid, a coolant passageway through said condenser and a heat rejecting surface, said heat rejecting surface being integral with said reflecting surface.

2. A combination collector - radiator element for a solar power conversion system which is adapted to be used in space vehicles comprising a central substantially circular member, a plurality of radially extending panels hingedly mounted to the periphery of said central member, a plurality of fluid passageways formed on said panels and said central member, said collector-radiator element having a substantially paraboloidal reflecting surface formed thereon.

3. A combination collector - radiator element for a solar power conversion system which is adapted to be used in space vehicles comprising a central substantially circular member, a plurality of radially extending panels hingedly mounted to the periphery of said member, said panels and said member having a substantially paraboloidal reflecting surface formed on one side and a heat rejection surface formed on the opposite side, a plurality of fluid passageways formed in said heat rejection surface of said member and said panels, a plurality of headers coupled to said fluid passageways, and a flexible conduit coupling said fluid passageways on said central member to said fluid passageways on said panels.

4. A solar power conversion system adapted to be used with space vehicles comprising a combination collector-radiator element, said element including a substantially circular central member, a plurality of radially extending panels hingedly mounted to the periphery of said central member, said element forming a substantially paraboloidal reflecting surface on one side when said panels are extended and a heat rejection surface on its opposite side, a plurality of fluid passageways formed on said central member and said panel, a flexible conduit coupling said fluid passageways on said central member to said fluid passageways on each of said panels, a boiler disposed at substantially the prime focal point of said paraboloidal reflecting surface, means for circulating a fluid to be vaporized through said boiler and said turbine means, an alternator connected to be driven by said turbine means, condenser means connected to extract heat from the exhaust from said turbine means, and a plurality of conduits coupling said condenser means to said plurality of fluid passageways formed on said central member and said radially extending panels.

5. A solar power conversion system adapted to be used with space vehicles comprising a combination collector-radiator element, said element including a central fixed substantially circular member, a plurality of radially extending panels hingedly coupled to the periphery of said central member, said element being in the shape of a paraboloid when said panels are extended, a highly reflective surface formed on the inner surface of said element, a plurality of fluid passageways formed on the outer surface of said panels and said central member, a plurality of flexible conduits connecting the fluid passageways on said central member to the fluid passageways on each of said panels, a boiler disposed at substantially the prime focal point of said paraboloidal reflecting surface, first and second turbine means, means for circulating a first fluid through said boiler and said first turbine means, a combination condenser-boiler, means for circulating a first working fluid through said boiler, said first turbine means, and said combination condenser-boiler, a relatively compact condenser, means for circulating a second working fluid through said second turbine means, said combination condenser-boiler, and said relatively compact condenser, and a plurality of fluid passageways connecting said fluid passageways formed on said central member and said panels to said combination condenser-boiler and said relatively compact condenser.

6. A solar power conversion system for space vehicles comprising a collapsible reflector-radiator element having a parabolic reflecting surface, a boiler positioned to receive solar energy focused thereon by said reflecting surface, and conduit means connecting said boiler with said reflecting surface, said reflector-radiator element being composed of a plurality of panels foldable about said conduit means in the collapsed position of the assembly.

7. A solar power conversion system for space vehicles comprising a collapsible reflector-radiator element having a parabolic reflecting surface, a boiler positioned to receive solar energy focused thereon by said reflecting surface, conduit means connecting said boiler with said reflecting surface, said reflector-radiator element being composed of a plurality of panels foldable about said conduit means in the collapsed position of the assembly, each of said panels having conduits therein, and means for circulating a coolant through said conduits in said panels.

References Cited in the file of this patent
UNITED STATES PATENTS

| | | |
|---|---|---|
| 811,274 | Carter | Jan. 30, 1906 |
| 2,968,916 | Taylor et al. | Jan. 24, 1961 |
| 3,070,703 | Podolny | Dec. 25, 1962 |